United States Patent
Narroschke et al.

(10) Patent No.: US 12,299,906 B2
(45) Date of Patent: May 13, 2025

(54) ESTIMATING THE MOVEMENT OF AN IMAGE POSITION

(71) Applicant: HOCHSCHULE RHEINMAIN UNIVERSITY OF APPLIED SCIENCES WIESBADEN RUESSELSHEIM, Wiesbaden (DE)

(72) Inventors: Matthias Narroschke, Schaafheim (DE); Andreas Kah, Kelsterbach (DE)

(73) Assignee: HOCHSCHULE RHEINMAIN UNIVERSITY OF APPLIED SCIENCES WIESBADEN RUESSELSHEIM, Wiesbaden (DE)

( * ) Notice: Subject to any disclaimer, the term of this patent is extended or adjusted under 35 U.S.C. 154(b) by 925 days.

(21) Appl. No.: 17/435,534

(22) PCT Filed: Feb. 28, 2020

(86) PCT No.: PCT/EP2020/055352
§ 371 (c)(1),
(2) Date: Nov. 23, 2021

(87) PCT Pub. No.: WO2020/178198
PCT Pub. Date: Sep. 10, 2020

(65) Prior Publication Data
US 2022/0148200 A1 May 12, 2022

(30) Foreign Application Priority Data
Mar. 1, 2019 (DE) .................. 10 2019 105 293.9

(51) Int. Cl.
G06T 7/269 (2017.01)
G06T 7/207 (2017.01)
G06T 7/246 (2017.01)

(52) U.S. Cl.
CPC .............. *G06T 7/269* (2017.01); *G06T 7/207* (2017.01); *G06T 7/248* (2017.01)

(58) Field of Classification Search
CPC .......... G06T 7/269; G06T 7/207; G06T 7/248
See application file for complete search history.

(56) References Cited

U.S. PATENT DOCUMENTS

| 6,445,832 B1 * | 9/2002 | Lee .................. G06V 10/24 382/209 |
| 7,535,463 B2 * | 5/2009 | Wilson .............. G06F 3/0421 345/175 |

(Continued)

FOREIGN PATENT DOCUMENTS

| DE | 102017104957 A1 | 9/2018 |
| DE | 102018108324 A1 | 10/2018 |

OTHER PUBLICATIONS

Smith, Christopher E., et al. "Visual tracking for intelligent vehicle-highway systems." IEEE Transactions on Vehicular Technology 45.4 (1996): 744-759.

(Continued)

*Primary Examiner* — Charles T Shedrick
(74) *Attorney, Agent, or Firm* — PERRY + CURRIER INC.

(57) ABSTRACT

The invention relates to a computer-implemented method for estimating the movement of an image position of an image feature between a first image and a second image. The method includes: Determining a set of image windows in the first image, each image window having the image feature; Identifying at least a portion of the set of image windows in the second image; For the portion of the set of image windows, evaluating the quality of an assignment of each image window in the first image to the given image window in the second image, and selecting one of the image win- (Continued)

Figure 1:
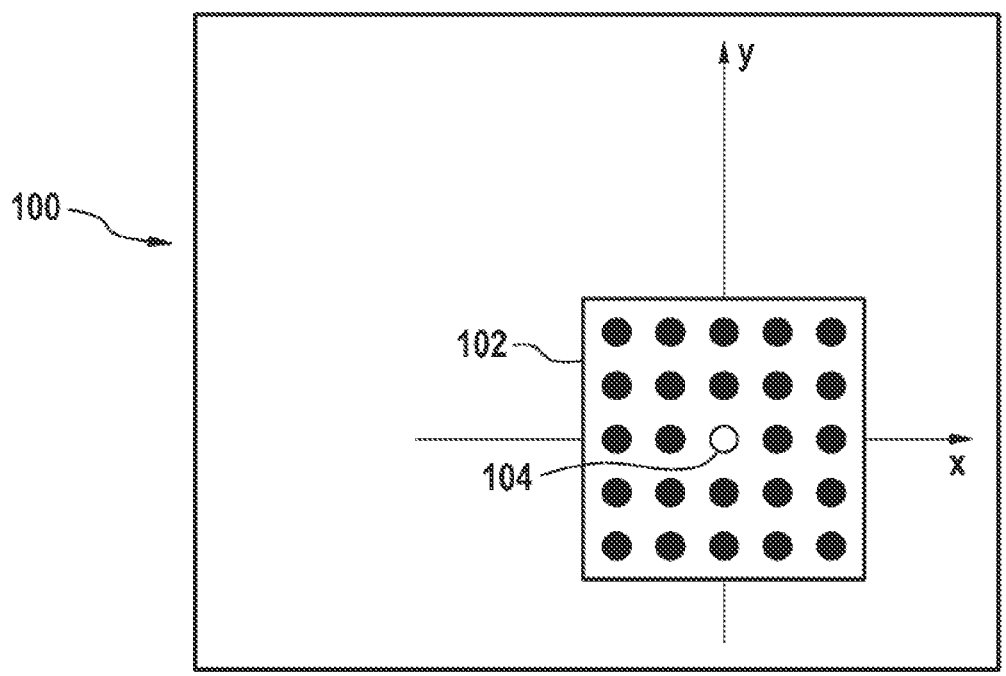

dows on the basis of the evaluation; and estimating the movement of the image position of the image feature using the selected image window.

19 Claims, 5 Drawing Sheets

(56) References Cited

U.S. PATENT DOCUMENTS

| | | | | |
|---|---|---|---|---|
| 9,650,025 | B2* | 5/2017 | Dagan | B60T 17/221 |
| 11,514,588 | B1* | 11/2022 | Musa | G06T 7/579 |
| 2005/0096543 | A1* | 5/2005 | Jackson | G06T 7/248 |
| | | | | 600/441 |
| 2009/0153474 | A1* | 6/2009 | Quennesson | G06T 7/269 |
| | | | | 345/157 |
| 2014/0169627 | A1* | 6/2014 | Gupta | G06V 20/588 |
| | | | | 382/103 |
| 2017/0083748 | A1* | 3/2017 | Zhou | G06T 7/248 |
| 2018/0025498 | A1* | 1/2018 | Omari | G06V 20/13 |
| | | | | 348/144 |
| 2018/0204331 | A1* | 7/2018 | Omari | G01S 13/76 |
| 2018/0293739 | A1* | 10/2018 | Gupta | G06V 10/62 |
| 2019/0318486 | A1* | 10/2019 | Gupta | G06T 7/285 |

OTHER PUBLICATIONS

Kah, Andreas et al. "Local Optical Flow Considering Object Boundaries by Adaptive Window Positioning." 2019 IEEE International Conference on Multimedia and Expo (ICME). IEEE, 2019.

Li, Siyang, et al. "Unsupervised video object segmentation with motion-based bilateral networks." Proceedings of the European conference on computer vision (ECCV). 2018. URL: https://openaccess.thecvf.com/content_ECCV_2018/papers/Siyang_Li_Unsupervised_Video_Object_ECCV_2018_paper.pdf.

Li, Xiaoxiao et al. "Video object segmentation with joint re-identification and attention-aware mask propagation." Proceedings of the European conference on computer vision (ECCV). 2018. URL: https://arxiv.org/pdf/1803.04242.pdf.

Nam, Hyeonseob et al. "Learning multi-domain convolutional neural networks for visual tracking." Proceedings of the IEEE conference on computer vision and pattern recognition. 2016.

Ranjan, Anurag et al. "Optical flow estimation using a spatial pyramid network." Proceedings of the IEEE conference on computer vision and pattern recognition. 2017.

Revaud, Jerome, et al. "Epicflow: Edge-preserving interpolation of correspondences for optical flow." Proceedings of the IEEE conference on computer vision and pattern recognition. 2015.URL: https://arxiv.org/pdf/1501.02565.pdf.

* cited by examiner

ESTIMATING THE MOVEMENT OF AN IMAGE POSITION

The invention relates to computer-implemented processing of digital image data, in particular to automatic tracking of a pixel from a first image to a second image.

Object tracking is an important tool used in many image processing applications. A problem that often arises in tracking the movement of an object in successive images is distinguishing the movement of an object from a background, which may itself vary. A related problem is the recognition of an image feature which must be recognized in one image in another image that was taken from a different perspective at approximately the same point in time. Examples of a scenario are the recognition of movements of human features such as head movements or facial features, and the recognition of pedestrians, vehicles and vehicle surroundings in traffic. When an image sequence is captured, it becomes clear that, for example, the background landscape and foreground objects are also moving in the image (for example, trees, vehicles and people). Movements of a foreground object relative to the image feature can even obscure in the second image the image feature which is visible in the first image. These effects reduce the degree of correlation between relative and absolute changes in position, and thus make tracking the object more difficult.

It is therefore an object of the invention to provide an improved computer-implemented method for estimating the movement of an image position of an image feature between a first image and a second image. The objects on which the invention is based are achieved by the features of the independent claims. Embodiments are given in the dependent claims.

To achieve the object, a computer-implemented method for estimating the movement of an image position of an image feature between a first image and a second image is provided, which has at least the following steps:

Determining a set of image windows in the first image, each image window having the image feature, Identifying at least a portion of the set of image windows in the second image, For the portion of the set of image windows, evaluating the quality of an assignment of each image window in the first image to the given image window in the second image, and selecting one of the image windows on the basis of the evaluation, and Estimating the movement of the image position of the image feature using the selected image window.

The method relates image information of a first image to image information of a second image. In particular, an image feature is present which is determined from the image information of the first image and which is characterized by an image position. It is assumed that both images are digital images and that the image position is given in coordinates $(x_0, y_0)$ of an image point (pixel) of the first image. However, these coordinates do not have to be integers. They can also be continuous. The image content at a non-integer image position can be determined, for example, by interpolation. According to embodiments, the first and the second image have identical dimensions, i.e., they have an identical resolution and extend over an identical number of pixels in each of the two image dimensions. This could be the case, for example, if both images were captured by the same image acquisition device (for example, camera, scanner), or by two different image acquisition devices with identically dimensioned image sensors, or by two image acquisition devices with different sensors but drivers configured identically with regard to the output resolution. However, the invention is not restricted to identical resolutions. The two images can also have different resolutions if, for example, the image coordinate systems of the two images are registered to each other. The image windows in the first image can be bounding boxes, for example, each of which has an image feature of an object.

An image feature is understood in this case as a contiguous image region which comprises at least the image point at the image position $(x_0, y_0)$. If an image feature comprises more than just the image point at the image position $(x_0, y_0)$, then the image position $(x_0, y_0)$ indicates a reference point of the image feature. The image position and optionally further properties of the image feature are received, for example, as an output ("distinctive point") of a recognition algorithm, such as the Harris Corner Detector or another interest operator. However, this is not a general requirement. Rather, an image feature can be any pixel that is currently selected, for example, by an algorithm that, for example, sequentially selects pixels (for example, every pixel of the given image), or a pixel that is randomly or arbitrarily selected (for example, by a user) and that a recognition algorithm would not necessarily identify as a distinctive point.

The invention assumes that the structure reproduced in the image information of the first image (e.g., a photographically-captured real object or a virtual model structure) has a region of overlap with the structure reproduced in the image information of the second image, within which the structure represented by the image feature is located. This does not rule out a covering of the mentioned structure in the second image, for example due to movement and/or a difference in perspective. As a result, the image feature can be completely or partially absent in the second image. Due to a changed perspective, a new structure can also be revealed, for example at the edges of the object.

An image window, or window for short, is defined herein as a logical selection or delimitation of an image region. Image processing algorithms can be applied to the image data within an image window independently of image regions outside the image window. It should be noted that pixels directly adjacent to a window can be included in the calculation by some algorithms, as is known, for example, when calculating nearest-neighbor differences or mean values. An image window can have any geometric shape. Each pixel within the window preferably has at least one adjacent pixel within the window. Preferably each image window is rectangular in shape, more preferably square. The image windows in the first image can be different bounding boxes, for example, with each bounding box containing the same image feature of an object.

In the step of determining the set of image windows, the position and size of each image window in the first image are selected such that the image position $(x_0, y_0)$ lies within the image window. In embodiments of the invention, the image feature has a size of $1 \times 1$ pel$^2$, where one pel corresponds to the distance between two pixels, and each image window is square with a size of $(2N+1)$ pel in each image dimension, where N is a natural number of the same value for each window. An expedient choice for the value N could correspond to a length scale for which recognition of the image feature is expected in the second image and/or which, in combination with the other windows of the set, allows a larger area surrounding the image position to be covered as completely as possible. According to embodiments, N has a value of at least 3.

The step of identifying at least a portion of the set of image windows in the second image includes at least one positioning of a window in the second image, wherein the image window positioned in the second image corresponds to one of the image windows of the set positioned in the first image. The identification step can implement further actions known from the prior art or disclosed herein, for example a search for an image region in the second image having image content which matches the image region covered by the set of image windows in the first image, thus being best suited for positioning the window in the second image; an identification of an image feature corresponding with high similarity to the image feature in the second image; or a determination of a difference between the image contents of corresponding image regions, for example by calculating the signal difference per image point or the optical flow. Furthermore, for example, the step of identifying at least a portion of the set of image windows in the second image can be carried out using an optical flow determination method. For each image window in the first image of the portion of the set of image windows, a corresponding associated image window is determined in the second image using the optical flow determination method.

The result of the identification step is that one or more windows of the set are defined in the second image, and are each assigned to one of the windows in the first image. The identification may be incomplete—i.e., it may not be possible to assign, to every window positioned in the first image, a window in the second image. This could be the case, for example, if a comparison is carried out between the first and the second image and a poor match results—for example, if in the second image the structure of the image feature is partially or completely obscured, corrupted or lost, and/or separated from its surroundings, compared to the first image.

For each of the windows identified in this way, a quality of the assignment of the given image window in the first image to the corresponding image window in the second image is then determined. In principle, any measure that quantifies a difference between the image contents of each assigned window pair, and/or between the image features corresponding to each other in the first and second image, can be used as a measure for quality. Examples of quality measures are described in more detail in the further course of the present disclosure. The quality can also be measured in the same work step with the identification of a window, such that if the quality exceeds or falls below a specified threshold value, this could serve as a criterion for accepting or rejecting an attempted assignment.

Based on the given quality, one of the image windows in the second image is selected to continue the method. Preferably, the image windows for which the quality measure has the highest value compared to the other image windows is selected.

Finally, using the selected image window, the movement of the image position of the image feature is estimated. This can be done, for example, by calculating the optical flow between the first and the second image within the selected image window, or using another suitable approach known from the prior art. The estimation could make it possible to detect changes in the image content between the selected window and the window assigned to it in the first image. This could in particular enable precise tracking of the movement of the image feature.

Advantages of the described method could include that tracking of an image feature could also be made possible if the image feature is covered in the second image. In the case of full coverage, the quality of the assignment would be zero (or some other value that indicates a low match), and the image window is likely to be in an unsuitable location for tracking. Optimizing on the basis of the quality measure, however, could allow positioning the image window in such a way that there is no overlap, or the smallest possible overlap, and reliable tracking of the image feature could be made possible. On the basis of a suitable selection of size, position and shape of the image window, it could be ensured that at least a portion of the window always remains visible even if it is covered in the second image.

In addition, it could be irrelevant in estimating the movement to, for example, not determine the optical flow from the entire image regions of the two images, but rather only within the selected window relative to its assigned window in the first image. In this way, computing resources used for recognition could be used more efficiently. The identification step can also take place, in particular in the case of images with identical resolution, by simply positioning a copy of each set of windows at the identical coordinates of the second image, such that a minimal use of computing resources could be required for this step. Due to its efficiency, the method according to the invention could be particularly suitable for large-format images (for example with a resolution of at least 10,000 pixels in each image dimension).

The functionality of the method is illustrated by the following example. A task which much be performed is tracking the movement of an aircraft on an airfield using video surveillance. In the step of determining a set of image windows in the first image, a set of different bounding boxes is determined in a frame of a video signal from a video surveillance camera (i.e., in the first image). Each bounding box contains a characteristic feature of an image of the aircraft, such as, for example, an image of a specific aircraft window of a pilot's cabin of the aircraft. The bounding boxes also contain images of different fragments of the aircraft, such as adjacent fragments of a missile and/or one or more other aircraft windows of the pilot's cabin.

A second image used in the step of identifying at least a portion of the set of image windows in the second image comes from a different frame of the video signal showing a different view of the pilots cabin. The positions of the views of the cabin are different in the first and in the second image. In addition, the images of the particular aircraft window and the adjacent fragments of the aircraft in these images are also different. These imaging differences are caused, for example, by stronger sunlight in the second image. As a result, some fragments of the cabin have reflective glare in the second image, and a window curtain has now changed the appearance of the particular aircraft window. This means that the images of the particular aircraft window, and images of various adjacent fragments, are different in the first and in the second image. The above-described use according to the invention, of the set of image windows (bounding boxes) in the first image can now ensure that at least one bounding box is positioned expediently enough in the first image that it can be identified in the second image, because it—keeping with the above example—shows an image of cabin fragments that have no reflective glare in the second image.

In the further method, a quality of an assignment of each image window (bounding box) in the first image to the given image window (bounding box) in the second image is evaluated, and one of the image windows (bounding boxes) is selected on the basis of the evaluation. This step is used to select the bounding box in the second image with a content which matches the corresponding bounding box in the first image as closely as possible. In the example mentioned above, the selected bounding box in the second image has a depiction of one or more cabin fragments without reflective glare that provide the best quality for the selected bounding box. In the final step, the movement of the image position of the image feature (the particular aircraft window) is estimated using the selected image window (the selected bounding box). Estimating the movement of the aircraft window is sufficient to estimate the movement of the entire aircraft.

According to embodiments, all image windows of the set have an identical geometric shape and identical dimensions. According to embodiments, the image windows are positioned around the image feature according to a predetermined arrangement. According to embodiments, the image windows are positioned around the image feature according to a random arrangement. According to embodiments, each image window of the set has a center point and the center point of each image window of the set lies within a predetermined radius or a predetermined search window around the image position. According to embodiments, each image window of the set lies within a predetermined radius or a predetermined search window around the image position. According to embodiments, at least one of the windows in the second image is positioned in the same place as the corresponding window in the first. According to embodiments, both images have identical dimensions, and the identification for each window comprises positioning a copy of the window in the second image at the coordinates of the window in the first image.

According to embodiments, the set of image windows surrounds the image position in the first image point-symmetrically about the image position. In this way, a particularly uniform scanning of the expected surroundings of the image feature in the second image could be achieved. For example, the set of image windows could include 9, 25, or 49 image windows.

According to embodiments, the set of image windows comprises fewer than 10 image windows, in particular 9, 5 or 3 or fewer than 3 image windows. A reduction in the number of image windows could bring about an increase in the efficiency of the method when using computing resources. With the numbers 9, 5 or 3, a point-symmetrical arrangement of the set of image windows could be achieved in a particularly simple manner. By carefully positioning the reduced number of image windows, as will be described in more detail in the further course of the present disclosure, an isotropic coverage of the presumed surroundings of the image feature could be approximated with sufficient accuracy. A reduction in the number of image windows could be made possible on the basis of a careful prediction of the probable direction of displacement or movement of the image feature from the first to the second image, as will be described in more detail in the further course of the present disclosure.

According to embodiments, the set of image windows includes an initial image window, the method including detection of an edge in the initial image window, wherein the determination of the image windows contained in the set of image windows in addition to the initial image window is made on the basis of the detected edge. Using an initial image window could allow iterative scanning of the surroundings of the image feature; in this iterative scanning, the set of image windows in the second image could be successively added (e.g., alternately on two or more sides of the initial window). The direction of the edge could define a preferred direction, such that the windows could, for example, be arranged in a parallel and/or perpendicular arrangement relative to the edge direction.

An edge can preferably be detected with the aid of a structure tensor or an autocorrelation matrix, as is known, for example, from the Lucas-Kanade method. The eigenvalues of the structure tensor show a clear difference in absolute value at one edge, and the eigenvector corresponding to the greater eigenvalue indicates a main or preferred direction which, in the case of an edge, corresponds approximately to the tangent slope of the edge at the point under consideration. However, other operators are also known from the prior art which, depending on the intended application, can be used equally for edge detection, for example the Sobel operator, the Scharr operator, the Laplace filter, the Prewitt operator, etc.

A detected edge typically defines a local preferred direction (tangent slope), which can deviate from the preferred direction with increasing distance from the reference point at which the edge direction was determined. In order to remedy the local limitation of the database for determining the edge direction, direction quantization could therefore be advantageous, i.e., an assignment of the determined actual edge gradient to a direction category. In one example, the direction categories are given in multiples of 45°, i.e., 0° (equivalent to 180°), 45° (equivalent to 225°), 90° (equivalent to 270°) and 135° (equivalent to 315°). In this example, an edge with a local tangent gradient of 104° would be assigned to the category 90°, and an edge with a local tangent gradient of 351° would be assigned to the category 0°.

According to embodiments, the image windows of the set of image windows are arranged one behind the other perpendicular to the detected edge. Following the assumption that edge overlaps preferably follow an optical flow perpendicular to the edge direction, this could allow the number of image windows to be reduced to 5 or 3, for example. Compared to a quasi-isotropic arrangement of image windows in two or more linearly independent directions, the windows parallel to the edge direction would then be omitted. This could enable an increase in efficiency in the use of computing resources.

According to embodiments, the initial image window is not taken into account in obtaining the portion of the set of image windows. Following the assumption that detectable movements of the image feature cause a displacement away from the starting position, the number of image windows could thus be further reduced, for example to 4 or 2 windows. This could enable a further increase in efficiency in the use of computing resources.

According to embodiments, in obtaining the portion of the set of image windows, a randomly selected set of image windows is not taken into account. Random deletion of individual windows will randomize the arrangement of the rest of the windows in the set. If, due to the random arrangement among the other windows, none of the other windows are suitable for adequately tracking the image feature, this effect could be negligible with a large number of tracked image features, i.e., a sufficiently high quality level could still be achieved on average over all image features of the image. Thus, this could be an alternative or additional approach to reducing the number of image windows of the set of image windows.

According to embodiments, the at least one portion of the set of image windows in the second image is identified using an optical flow determination method. The optical flow can provide information about the direction and distance of a displacement in the image feature and/or its surroundings. In this way, the image region for the identification of the image windows could be localized more precisely. This could be particularly helpful if the image difference between the first and the second image is due to high speed, or to a large difference in viewing angles, such that the displacement distance is comparable to or greater than the dimensions of the image windows or the region enclosed by the entire set of image windows. For rough localization in the case of reduced resource use, the optical flow could be determined on the basis of copies of the first and second images with reduced resolution (an image pyramid), and the actual identification or placement of the image windows then takes place in the second image with the original resolution.

According to embodiments, the optical flow determination method is the Lucas-Kanade method or the Horn-Schunck method. Compared to algorithms that are more computationally involved, these methods could enable more efficient use of the computing resources used.

According to embodiments, the edge is detected based on the structure tensor of the Harris method or the Lucas-Kanade method. The structure tensor is also known as the autocorrelation matrix and, in an exemplary illustration, is:

$$G = \sum_{x,y \in \Omega} \begin{pmatrix} g_x^2(x, y) & g_x(x, y) \cdot g_y(x, y) \\ g_x(x, y) \cdot g_y(x, y) & g_y^2(x, y) \end{pmatrix}$$

where the sum runs over all positions (x, y) of the window $\Omega$, and $g_x(x, y)$ and $g_y(x, y)$ are the gradients of the image signal in the x and y directions at position (x, y). If the structure tensor was already calculated at an earlier point in time, it could be used again for the edge detection, without a specific edge operator having to be calculated. If, on the other hand, the structure tensor for edge detection is being calculated for the first time, a repeated calculation of the structure tensor in the step of estimating the movement of the image position could be dispensed with. In either case, the benefit of more efficient use of computing resources could be achieved.

In one example, the method uses both the Harris operator (det $G+k^*(\text{trace}(G))^2$, where G is a structure tensor and k is an empirically determined parameter, for example) and a method for determining the optical flow. For example, the set has a central image window around which the remaining windows of the set are arranged in a mirror-symmetrical or point-symmetrical manner. According to the example, the Harris operator is only used for edge detection within the central window. An edge could thus be detected with high accuracy in the central window in order to enable precise positioning of the central window. The edge could then be detected in the remaining windows of the set by means of the structure tensor according to Lucas-Kanade or Horn-Schunck. Compared to an application of the Harris operator in all windows, an additional computational effort for a later calculation of the optical flow for the other windows could be avoided in this way. The central window can be the initial window, for example.

According to embodiments, the determination of the image windows contained in addition to the initial image window in the set of image windows, on the basis of the detected edge, includes: Determining a first direction based on the eigenvector of the structure tensor, which corresponds to the greatest eigenvalue, and determining a second direction perpendicular to the first direction, wherein the image windows contained in the set of image windows in addition to the initial image window are arranged along the second direction. Assuming that the direction of the eigenvector to the greater eigenvalue corresponds to the direction of extension of the edge, the edge direction could be determined without using a specific edge detection operator. In this case, too, an angular range division or direction quantization, as described above, could be used.

According to embodiments, the movement is estimated on the basis of the difference in position of the selected image window between the first image and the second image. The difference vector between the window in the second image and the window assigned to it in the first image could be interpreted as a displacement in the image feature, such that an approximation of the actual distribution of the optical flow could be obtained without explicitly calculating the optical flow. In this way, the efficiency of computing resource use could be further increased.

According to embodiments, the estimation of the movement comprises an identification of the selected image window in the second image, wherein
  for each image window of the at least one portion of the set of image windows, the identification of the image window in the second image takes place iteratively, with a first number of iteration steps for different positions of each image window in the second image, and
  the selected image window in the second image is identified iteratively with a second number of iteration steps for different positions of the selected image window in the second image,
wherein the second number is greater than the first number.

Due to the iterative approach, an identification of the windows with a higher quality could be achieved in this way, and the movement could thus be estimated with a higher accuracy. A comparatively rough positioning of the windows in the second image could be achieved with a limited number of first iteration steps, while the second iteration steps for the actual estimation of the movement are limited to the selected window with high accuracy. For example, the first and/or second number of iteration steps could be the iterations of the Lucas-Kanade method.

According to embodiments, the estimation of the movement takes place using an optical flow determination method. This could have the advantage of a more accurate estimate of the movement.

According to embodiments,
  for each image window of the at least one portion of the set of image windows, the identification of the image window in the second image takes place iteratively, with a first number of different image resolutions of the first and second images, wherein, starting from the lowest image resolution, the result of the identification of the image window is used for identifying the image window with a higher image resolution, and
  the identification of the selected image window in the second image takes place iteratively, with a second number of different image resolutions of the first and second image, wherein the result of the identification of the selected image window is used, starting from the lowest image resolution, to identify the selected image window at a higher image resolution,
wherein the first number is less than the second number.

In this way, the displacement vector of the image feature could be determined with high accuracy. In one example, the different image resolutions are parts of an image pyramid which, for example, has already been calculated at the beginning of the method. In the example, a pyramidal iterative algorithm calculates the optical flow in each iteration step, for example using the Lucas-Kanade or Horn-Schunck method.

The increase in the second number compared to the first number could have the effect that the total number of iteration steps, exclusively for identifying the selected window, is sufficiently high for a positioning with high spatial precision. A comparable computational effort for the unselected windows could thus be avoided.

According to embodiments,
the portion of the set of image windows in the second image has first image sizes, and
for estimating the movement of the image position of the image feature, the selected image window is enlarged compared to the associated first image size.

This could result in an enlargement of the database for the estimation of the movement compared to the identification of the windows in the second image. By using smaller images before estimating the movement, computing resources used to determine the selected image window could be used more efficiently. The image size is only increased for the actual movement estimation. The movement could thus be estimated with a higher degree of accuracy than the positioning of the windows to be identified in the second image.

According to embodiments, with respect to a given image window of the portion of the set of image windows in the first image, the evaluation of the quality is selected from one of the following criteria:
Starting from the identified image window in the second image, identification of an associated image window in the first image, wherein the evaluation of the quality is a measure of the congruence of the identified associated image window in the first image with the image window of the set of image windows in the first image, optionally with an identification of the associated image window in the first image using an optical flow determination method;
Determination of a degree of scattering of the image content of the image window in the first image with respect to the identified image window in the second image, the evaluation of the quality being based on the degree of scattering;
Determination of the Lagrangian costs of a degree of scatter of the image content of the image window in the first image with respect to the identified image window in the second image, and determination of a further measure, the further measure being based on one of the following variants:
i. The gradient of the image content of the image window in the first image or in the second image;
ii. The structure tensor of the Harris method or the Lucas-Kanade method;
iii. A cornerness measure of the image content of the image window in the first image or in the second image.

According to the first criterion ("return criterion"), it is assumed that, starting from the image window in the first image, the associated image window in the second image is first identified with a corresponding identification method (for example, Lucas-Kanade). Conversely, the same should apply if the identification was correct: That is, if you start from the identified image window in the second image and use the same identification method to determine which image window in the first image it belongs to, the resulting outcome, i.e., a "return window" in the first image, would necessarily be congruent with the original image window in the first image. The congruence can be determined, for example, on the basis of the image position of the original image window and return window, or image information from a region surrounding the image position of the original image window and return window. The length of the difference vector between the original image window and the return window, for example, could serve as a quality criterion, congruence being established at zero length of the difference vector.

According to the second criterion ("scatter criterion"), differences between the image content of the window in the first and second image are quantified by a degree of scatter. For example, an immovable object in an immovable environment under constant lighting conditions, and the use of an identical and immobile image capturing device for both images, could result in almost identical image content in a region around the image feature, which could correspond to a degree of scatter close to zero. In contrast, an obstruction of the image feature could result in a high degree of scatter. A degree of scatter could, for example, be differentially calculated for each pixel (for example, the difference between the image signals or the square thereof), and added up or averaged in rows and/or columns. For example, the sum of the squared deviations, the standard deviation, or the variance over all pixels in the corresponding window pair could be contemplated. Using the scatter criterion could make an operator-based evaluation of the quality measure unnecessary, and thus contribute to the efficient use of computing resources.

According to the third criterion ("Lagrange criterion"), a further measure B is added to the previously discussed degree of scatter A in order to define a Lagrange cost function L=A+w*B, with a weighting factor w. By taking into account the further measure B, for example, the risk of a false positive assignment could be reduced. A suitable value for the weighting factor w can be determined, for example, by training a machine learning model, or also empirically. According to variant iii, B can have a cornerness measure, such as, for example, the cornerness response function according to Harris and Stephens, the determinant or trace of the Hessian matrix, or other methods that use the Laplace operator and/or a Gaussian filter.

According to embodiments, the degree of scattering comprises a mean or absolute square error. This could bring about a further increase in the efficiency of the use of computing resources by simplifying the calculation of the quality measure.

According to embodiments
the identified image window in the second image is displaced by a first vector compared to the given image window in the first image,
the associated image window in the first image is displaced by a second vector compared to the identified image window in the second image, and
the evaluation of the quality takes into account a comparison of the first and second vector.

When the return criterion described above is used, a vector comparison of the displacement between the original window and the window in the second image ("first displacement vector", "first displacement") with the displacement between the window in the second image and the return window ("second displacement vector", "second displacement"), could take into account, in addition to the distance resulting from each displacement, directional information for each displacement. For example, if the original window and the return window are completely congruent, both components of the second displacement vector should have opposite signs to the corresponding components of the first displacement vector. If this is not the case in a given scenario, this could be an indication of existing optimization potential in the identification. This could be included in the calculation of the quality measure, for example through subtractions.

In a further aspect, the invention relates to a computer program product with instructions that can be executed by a processor for carrying out the method disclosed herein.

In a further aspect, the invention relates to a device for estimating the movement of an image position of an image feature between a first image and a second image, the device comprising a processor and a memory with instructions, wherein the execution of the instructions by the processor results in the device:

Determining a set of image windows in the first image, each image window having the image feature, Identifying at least a portion of the set of image windows in the second image, For the portion of the set of image windows, evaluating the quality of an assignment of each image window in the first image to the given image window in the second image, and selecting one of the image windows on the basis of the evaluation, Estimating the movement of the image position of the image feature using the selected image window.

Figure 2:
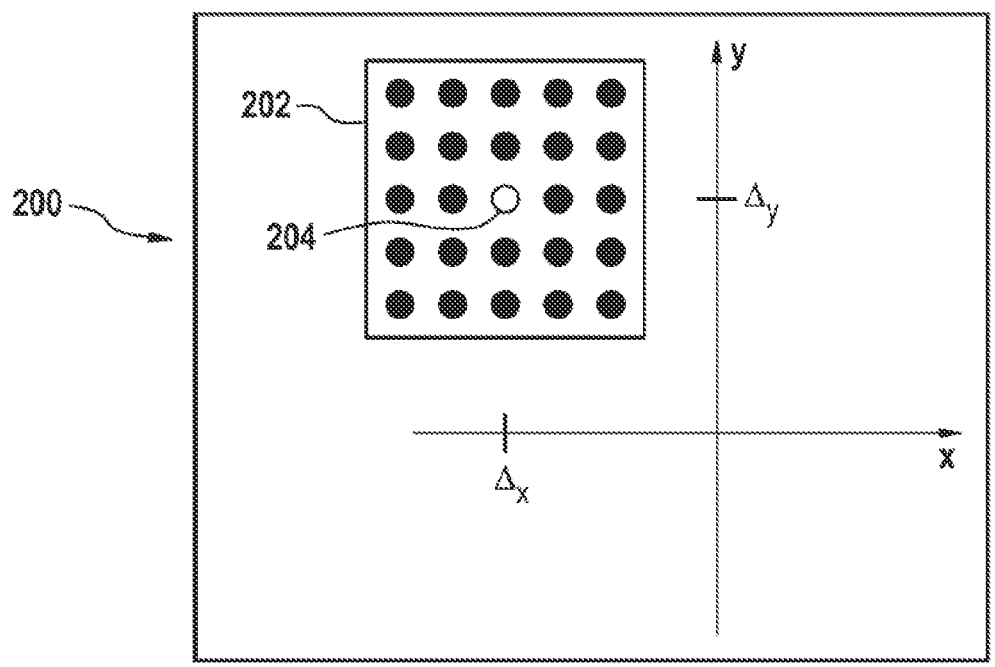
Figure 3:
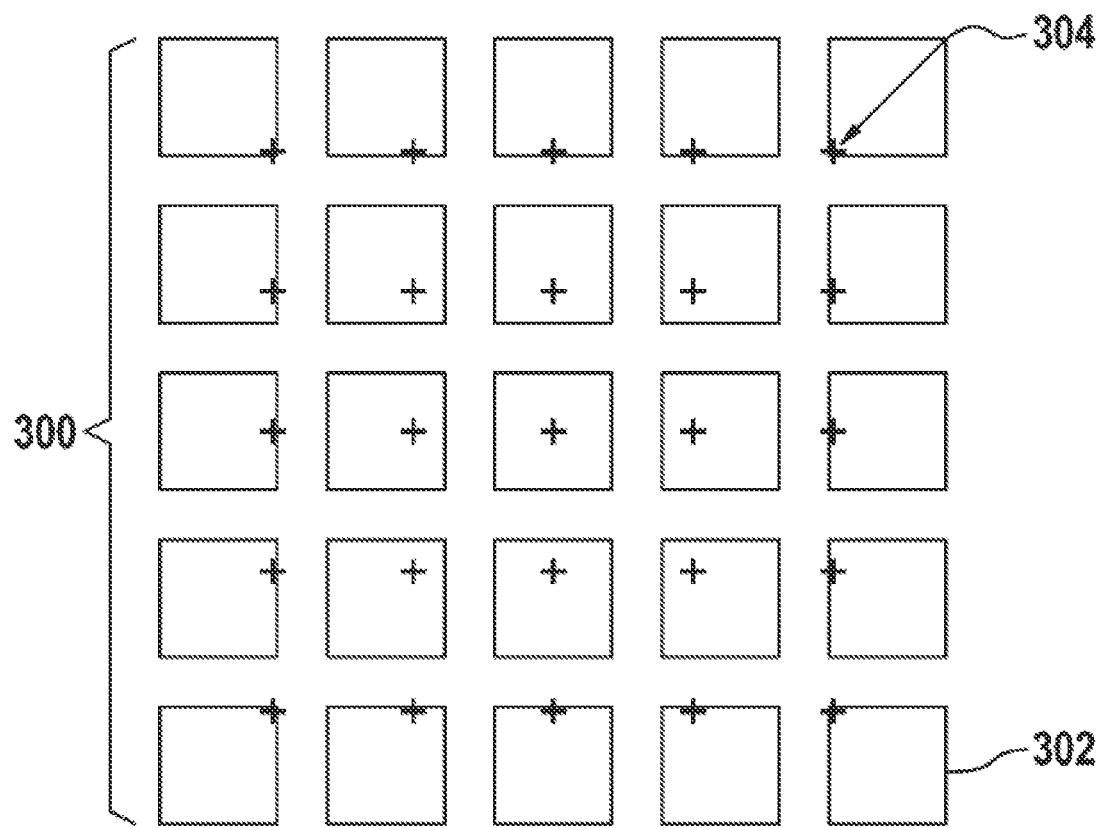
Figure 4:
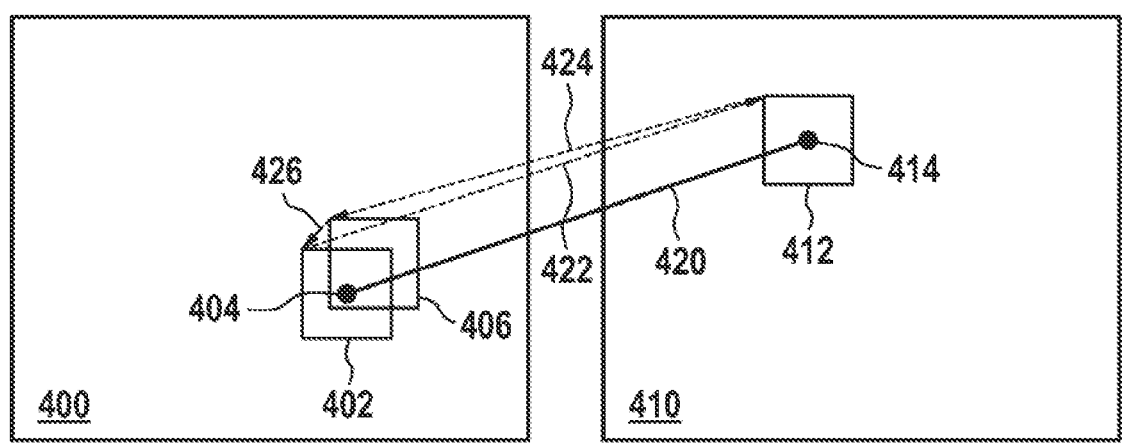
Figure 5:
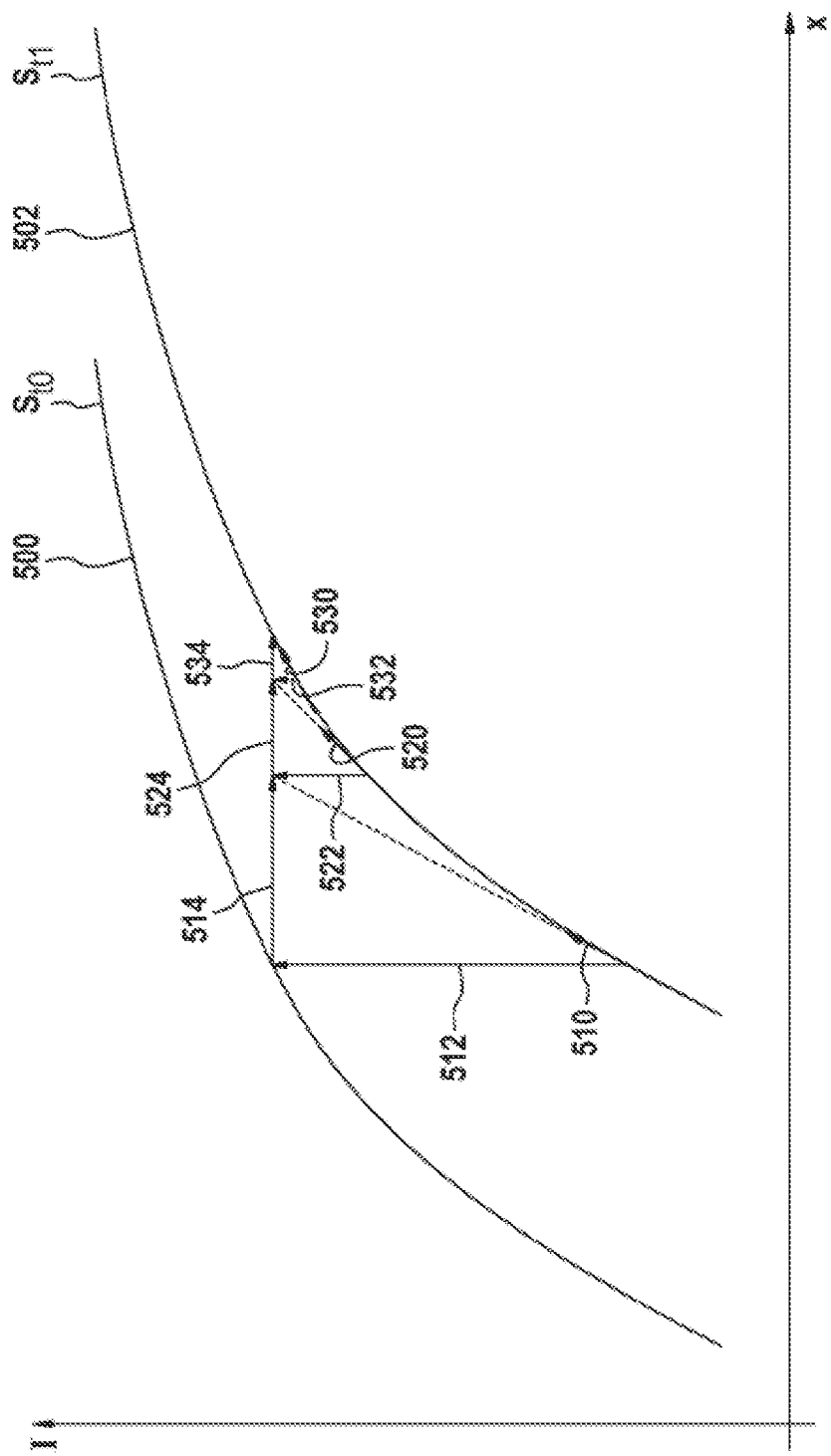
Figure 6A:
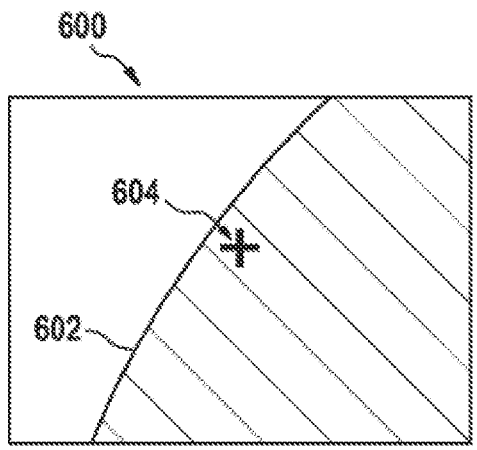
Figure 6B:
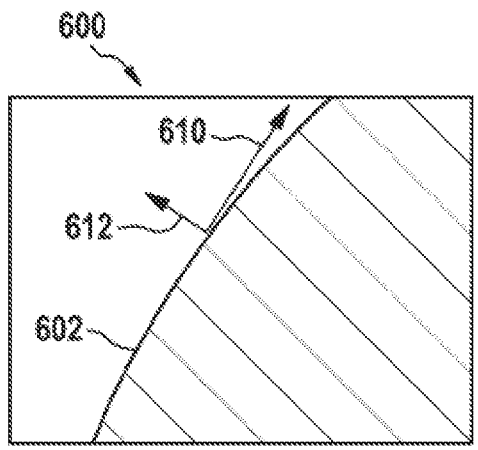
Figure 6C:
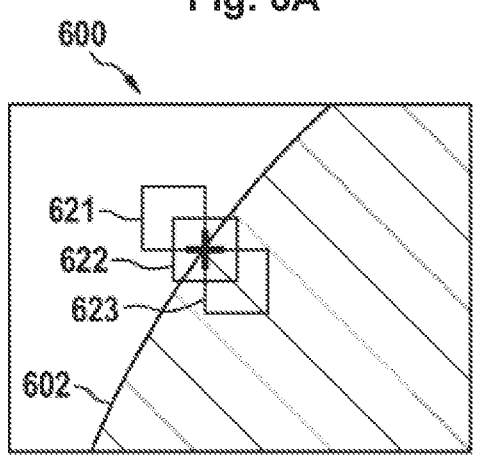
Figure 6H:
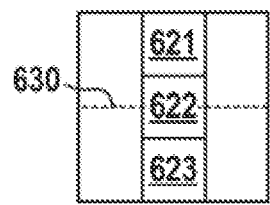
Figure 6H:
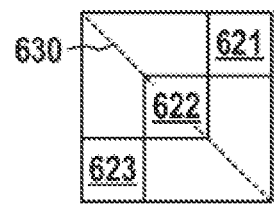
Figure 6H:
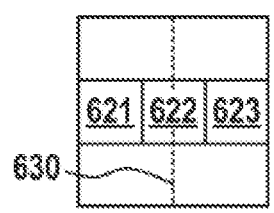
Figure 6H:
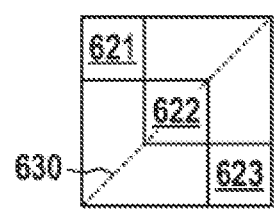
Figure 6H:
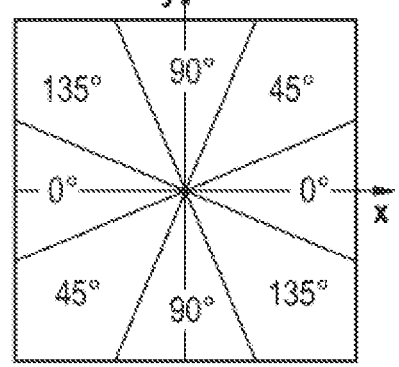
Figure 7:
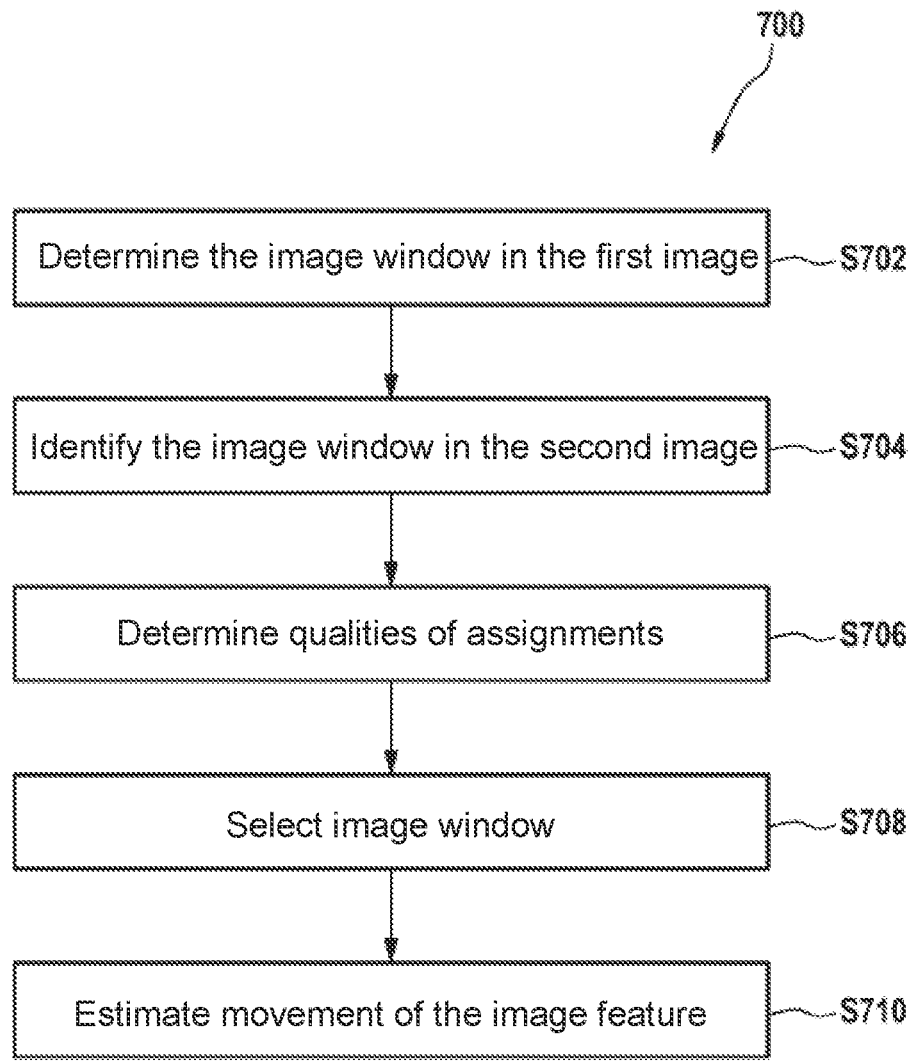

Further advantages and features emerge from the following description in conjunction with the accompanying drawings, wherein:

FIG. 1 is a portion of an image from a first image:
FIG. 2 is a portion of an image from a second image;
FIG. 3 is a set of image windows;
FIG. 4 is an application of a return criterion:
FIG. 5 is an iterative determination of a displacement vector;
FIG. 6A is a portion of an image, with an image feature in the vicinity of an edge;
FIG. 6B is a portion of an image, with an edge and two eigenvectors of a structure tensor;
FIG. 6C is a portion of an image, with an edge and a set of image windows;
FIG. 6D through 6G each show an arrangement of three image windows according to a directional category;
FIG. 6H is a set of directional categories; and
FIG. 7 is a block diagram illustrating a method for estimating the movement of an image position of an image feature between a first image and a second image.

FIG. 1 schematically shows a portion 100 of an image from a first image, in which an image feature 104 (shown as a white circle) and an area of pixels surrounding the image feature 104 (shown as black circles) are enclosed by an image window 102.

The image window 102 is square, with the edge length (2 N+1) pel=5 pel, and the image feature 104 lies at the central position (2, 2) of the image window 102—i.e., the image feature 104 is surrounded by N=2 pixels within the image window 102 in each of the image dimensions x and y. The image window 102 is underlaid with an x, y coordinate system, the origin of which lies at the position of the image feature 104.

FIG. 2 schematically shows a portion 200 of an image from a second image. The image portion 200 shows an image region of identical position and extension in x and y as the image region 100 from the first image. The image portion 200 also shows a coordinate system with an origin at the same position as the coordinate system in the image portion 100. The second image depicts the object structure on which the image feature 104 is based at a different point in time and/or from a different viewing angle, as an image feature 204 within the image portion 200. The image feature 204 is therefore displaced with respect to the position of the image feature 104 in the image portion 100 (that is to say, the origin of the coordinate system) by a displacement Δx in the x direction, as well as by a displacement Δy in the y direction.

The image feature 204 was identified, for example, on the basis of its image signal value (brightness, intensity), its color (distribution of the image signal over different image channels), gradients of the image signal in the x and/or y direction, a comparison of image information in its surroundings, or a combination of the above criteria with the image feature 104 in the image portion 100. On the basis of the identification of the image feature 204 with the image feature 104, a window 202 was identified with the image window 104, enclosing the image feature 204 and a region of pixels surrounding the image feature 204. The image window 202, like the image window 102, is square, with the edge length (2 N+1) pel=5 pel, and the image feature 204 is at the central position (2, 2) of the image window 202.

FIG. 2 shows the ideal case of a fully correlated identification, in which the image window 202 is positioned relative to the image feature 204 exactly as the image window 102 is positioned relative to the image feature 104. However, this does not necessarily apply in the general case. It is generally assumed that the object structure on which the image feature 104 is based is reproduced in the second image by an image feature 204 that lies within an image region which, if the position and size in the first image were identical, would include the image feature 104 within an environment of the image feature 104. As a result, one approach to identifying the image feature 204 is to generate a set of image windows that cover this environment—that is, the image windows of which are arranged such that each pixel of the environment is enclosed by at least one image window of the set. If, in order to identify the image feature, one demands that each image window of the set is arranged in the first image in such a way that it also encloses the image feature 104, then the displacement of the image feature from the first to the second image corresponds to a transformation between a window 102 and a window 202 of the set of image windows.

FIG. 3 shows an exemplary set 300 of 25 square image windows 302, with an edge length of 5 pixels, which are suitable for scanning a reference pixel 304 (shown as a cross "+"), for example at position $(x_0, y_0)$, in one of the 25 positions captured by each image window. The figure shows 25 copies of the same reference pixel 304 divided into five rows and five columns, such that the relative positioning of each window 302 with respect to the reference pixel 304 becomes clear. When the set 300 is positioned in the first image, the 25 copies of the reference pixel 304 coincide in a single pixel of the first image, and the 25 image windows 302 form an overlap of a square area with a dimension of 9×9 pixels, surrounding the reference pixel 304 in each image dimension at a length of four pixels. If the set 300 is positioned identically in the second image, every image feature of the second image that is completely within the 9×9 overlap region around the position corresponding to the position of the image feature is captured by the set 300 (as the set 300', with 25 image windows 302'; not shown in the figure).

FIG. 4 illustrates an example of an evaluation of the quality of the assignment of a window 412 in an image 410 to an original window 402 in a first image 400 by using a return criterion. The first image 400 has an image feature 404, which can be seen as an image feature 414 in the second image 410. The correspondence of the image features 404 and 414 is indicated by the displacement arrow 420, and the identification of the image window 412 with the original window 402 is indicated by the displacement arrow 422. The return criterion now provides for the identification of an image window for the image window 412 to be repeated as the initial structure in the first image. The result of this repetition is a return window 406 in the first image; its identification with the image window 412 is indicated by the displacement arrow 424.

As can be seen, the return window 406 is not in the same position as the original window 402, i.e., the windows 402 and 406 are not congruent. This is indicated by the difference arrow 426, which corresponds to the vector sum of the arrows 422 and 424.

One approach to selecting an image window could thus consist in repeating the return criterion for each image window of the portion of the set of image windows identified in the second image 410, and selecting the image window with the difference arrow 426, interpreted as a vector, which has the smallest amount. When differential vectors have the same value (vector sum of the displacement arrows, ideally antiparallel), the window whose scalar product with the displacement arrow 422 has the greatest value (i.e. the smallest directional deviation from the antiparallel case) could be selected as an additional criterion.

FIG. 5 illustrates an approach for the iterative determination of a displacement vector between an image feature in a first image and an image feature in a second image, as is used, for example, to determine the optical flow according to the iterative Lucas-Kanade method with the aid of image pyramids. The first image depicts an object structure at a point in time, to, and the second image depicts the object structure at a point in time $t_1$. The diagram shown (x-axis: location; y-axis: image signal) illustrates the brightness distribution 500 within an image line of the first image that has the image feature, together with the brightness distribution 502 within an image line of the second image that has the image feature. The example discussed below is based on an image pyramid with three different resolutions for the first and the second image.

The method begins with a determination of a first displacement vector by comparing the first image with the second image at the lowest available resolution level. In the example shown, this is done by determining a gradient 510 of the image signal between the position of the image feature projected onto the second image and the position of the image feature in the second image. This corresponds to a signal difference 512 and a location difference 514 (the diagram shows a line projection of the first displacement vector onto the highest resolution level). After the first displacement vector has been projected to a higher resolution level—i.e., in the example to the intermediate level between the lowest and the highest resolution—a second displacement vector is determined using a gradient 520 of the image signal between the end of displacement of the projected displacement vector and the position of the image feature on the intermediate level. This corresponds to a signal difference 522 and a location difference 524 (again in line projection at the highest level). By repeating at the highest resolution level, one finally obtains the last, third displacement vector, corresponding to a signal difference 532 and a location difference 534 in line projection, between the displacement end of the displacement vector projected at the highest resolution level and the image feature. In this way, a total displacement vector is obtained which corresponds to the sum of the three displacement vectors determined at the individual resolution levels.

FIG. 6A to 6H illustrate an exemplary method for positioning a set of three image windows 621, 622, 623 around an image feature 604 in the vicinity of an edge 602 in an image portion 600. A structure tensor for a reference point on the edge provides two eigenvalues and associated eigenvectors 610, 612. The eigenvector 610, which is larger in terms of magnitude, is aligned parallel to the tangent to the edge in the reference point; and the eigenvector 612, which is smaller in terms of magnitude, is perpendicular to the eigenvector 610. The image grid of the image portion 600 defines a horizontal direction with which the eigenvector 610 form an edge angle of approximately 66° (where 0° corresponds to the horizontal on the right-hand side of the image portion 600).

FIG. 6H shows a set of direction categories for categorizing the eigenvector 610 in edge angle categories 0° (at least −22.5° and less than +22.5° and at least 157.5° and less than 202.5°), 45° (at least 22.5° and less than 67.5° and at least 202.5° and less than 247.5°), 90° (at least 67.5° and less than +112.5° and at least 247.5° and less than 292.5°) and 135° (at least 112.5° and less than +157.5° and at least 292.5° and less than 337.5°). The angle range 0° includes the x-axis, and the angle range 90° includes the y-axis.

In FIG. 6D to 6G, the course of a straight line 630 is shown as a dashed line in one of the reference edge angles 0° (FIG. 6D), 45° (FIG. 6G), 90° (FIG. 6F) and 135° (FIG. 6E). If the edge angle is classified in one of these categories, the positioning approach provides for each of the windows 621, 622 and 623 to be positioned perpendicular to the given reference edge angle. In FIG. 6D to 6G, the three image windows 621, 622 and 623 are shown schematically in a non-overlapping arrangement in order to clarify the principle.

The edge angle at the starting point of the two eigenvectors 610, 612 in FIG. 6B is in the angle range of the category 45°. Thus, as shown in FIG. 6C, the windows 621, 622 and 623 are positioned in an overlapping configuration corresponding to the arrangement in FIG. 6G centered around the image feature 604 (alternatively centered around the starting point of the eigenvectors 610, 612).

FIG. 7 shows a block diagram illustrating a method for estimating the movement of an image position of an image feature between a first image and a second image. By way of example, image features are known in the first and the second images from an interest operator executed previously using the first or the second image as input. According to the method, in a step S702, for a given image feature, image windows of a set of image windows are positioned at different positions on the first image, such that each image window encloses an image region which completely contains the image feature. An example of an image window positioned in the first image is the image window 102 in FIG. 1, which encloses the image feature 104 in an image region 100 of a first image. An example of a set of image windows to be positioned is the set 300 of image windows 302 in FIG. 3.

In a step S704, at least some of the image windows of the set are identified in the second image. This can be done, for example, with the aid of a comparative approach or, for example, by positioning identical copies of the image windows at positions of the second image that are identical to the respective positions in the first image. A comparative approach can include, for example, a calculation of the optical flow between an image window positioned in the first image and an image window assigned to it and positioned in the second image. The identification has the effect that each image window of the portion of the set of image windows positioned in the second image is assigned an image window from the set of image windows positioned in the first image, and each image window from the set of image windows positioned in the first image is assigned at most one of the image windows of the portion of the set of image windows positioned in the second image. An example of an image window positioned in the second image is the image window 202 in FIG. 2, which encloses the image feature 204 in an image region 200 of a second image. An example of an identification of an image window positioned in a second image with an image window positioned in a first image is given by the arrow 422, which connects the image window 402 positioned in the first image 400 with the image window 412 positioned in the second image 410. An example of the placement of a portion of a set of image windows is illustrated by the image windows 721, 722 and 723 shown in FIG. 6C if, for example, the underlying set of image windows positioned in the first image comprises the image windows arranged in FIG. 3.

In a step S706, a quality variable is calculated for each image window of the portion of the image windows positioned in the second image. The quality variable is defined in such a way that it measures a degree of correspondence, for example, of the image region enclosed by the given image window of the second image with the image region enclosed by the corresponding image window of the first image. If the two image windows correspond completely or are congruent, the quality variable should assume an extreme value. An example of a quality variable is the length of the difference arrow 426 in FIG. 4, which measures the position difference between an original window 402 positioned in the first image 400 and a return window 406 determined on the basis of the image window 412 positioned in the second image 410 and assigned to the original window 402.

In a step S708, an image window is selected from the portion of the set of image windows positioned in the second image on the basis of the quality measure. The selection should choose the image window for which the quality measure shows a higher degree of correspondence than the respective quality measures of all further image windows of the portion of the set of image windows positioned in the second image.

For the selected image window, the movement of the image feature relative to the image window assigned to the selected image window in the first image is estimated in a step S710. This can be done, for example, by calculating the optical flow between the aforementioned image windows. The optical flow can be determined, for example, using the Horn-Schunck method, or also the iterative Lucas-Kanade method, the operating principle of which is illustrated schematically in FIG. 6.

It should be noted that the embodiments of the invention described above can be combined with each other in any way as long as the combined embodiments are not mutually exclusive.

LIST OF REFERENCE SYMBOLS 100 image portion
102 image window
104 image feature
200 image portion
202 image window
204 image feature
300 set of image windows
302 image window
304 reference pixel
400 image
402 original window
404 image feature
406 return window
410 image
412 image window
414 image feature
420 displacement
422 assignment
424 assignment
426 position difference
500 brightness distribution
502 brightness distribution
510 gradient
512 brightness difference
514 displacement
520 gradient
522 brightness difference
524 displacement
530 gradient
532 brightness difference
534 displacement
600 image detail
602 edge
604 image feature
610 eigenvector
612 eigenvector
621 image window
622 image window
623 image window
630 straight line
700 method

The invention claimed is:

1. A computer-implemented method for estimating the movement of an image position of an image feature between a first image and a second image, the method comprising:
   determining a set of image windows in the first image, each image window having the image feature,
   identifying at least a portion of the set of image windows in the second image,
   for the portion of the set of image windows, evaluating the quality of an assignment of each image window in the first image to the given image window in the second image, and selecting one of the image windows on the basis of the evaluation, and
   estimating the movement of the image position of the image feature using the selected image window,
   wherein the set of image windows comprises an initial image window, and the method comprises a detection of an edge in the initial image window, wherein the determination of the image windows contained in addition to the initial image window in the set of image windows takes place on the basis of the detected edge.

2. The method according to claim 1, wherein the set of image windows surrounds the image position in the first image point-symmetrically with respect to the image position.

3. The method according to claim 1, wherein the set of image windows comprises one or more of fewer than 10 image windows, 9 image windows, 5 image windows or 3 image windows, or fewer than 3 image windows.

4. The method according to claim 1, wherein the image windows of the set of image windows are arranged one behind the other perpendicular to the detected edge.

5. The method according to claim 4, wherein the initial image window is not taken into account in obtaining the portion of the set of image windows.

6. The method according to claim 1, wherein, in obtaining the portion of the set of image windows, a randomly selected set of image windows is not taken into account.

7. The method according to claim 1, wherein the identification of the at least on portion of the set of image windows in the second image takes place using an optical flow determination method.

8. The method according to claim 7, wherein the optical flow determination method being the Lucas-Kanade method or the Horn-Schunck method.

9. The method according to claim 7, wherein the detection of the edge is based on the structure tensor of the Harris method or the Lucas-Kanade method.

10. The method according to claim 9, wherein the determination of the image windows contained in addition to the initial image window in the set of image windows on the basis of the detected edge comprises: Determining a first direction based on the eigenvector of the structure tensor which corresponds to the greatest eigenvalue, and determination of a second direction perpendicular to the first direction, the image windows contained in the set of image windows in addition to the initial image window being arranged along the second direction.

11. The method according to claim 1, wherein the movement is estimated on the basis of the difference in position of the selected image window between the first image and the second image.

12. The method according to claim 11, wherein the estimation of the movement comprises an identification of the selected image window in the second image, wherein
for each image window of the at least one portion of the set of image windows, the identification of the image window in the second image takes place iteratively, with a first number of iteration steps for different positions of each image window in the second image, and
the selected image window in the second image is identified iteratively with a second number of iteration steps for different positions of the selected image window in the second image,
wherein the second number is greater than the first number.

13. The method according to claim 11, wherein the estimation of the movement is carried out using an optical flow determination method.

14. The method according to claim 1, wherein
for each image window of the at least one portion of the set of image windows, the identification of the image window in the second image takes place iteratively, with a first number of different image resolutions of the first and second images, wherein, starting from the lowest image resolution, the result of the identification of the image window is used for identifying the image window with a higher image resolution, and
the identification of the selected image window in the second image takes place iteratively, with a second number of different image resolutions of the first and second image, wherein the result of the identification of the selected image window is used, starting from the lowest image resolution, to identify the selected image window at a higher image resolution, wherein the first number is less than the second number.

15. The method according to claim 1, wherein
the portion of the set of image windows in the second image has first image sizes, and
to estimate the movement of the image position of the image feature, the selected image window is enlarged compared to the associated first image size.

16. The method according to claim 1, wherein, with respect to a given image window of the portion of the set of image windows in the first image, the evaluation of the quality is selected from one of the following criteria:
starting from the identified image window in the second image, identification of an associated image window in the first image, wherein the evaluation of the quality is a measure of the congruence of the identified associated image window in the first image with the image window of the set of image windows in the first image, optionally with an identification of the associated image window in the first image using an optical flow determination method;
determination of a degree of scattering of the image content of the image window in the first image with respect to the identified image window in the second image, the evaluation of the quality being based on the degree of scattering;
determination of the Lagrangian costs of a degree of scatter of the image content of the image window in the first image with respect to the identified image window in the second image, and determination of a further measure, the further measure being based on one of the following variants:
i. the gradient of the image content of the image window in the first image or in the second image;
ii. the structure tensor of the Harris method or the Lucas-Kanade method;
iii. a cornerness measure of the image content of the image window in the first image or in the second image.

17. The method according to claim 16, wherein
the identified image window in the second image is displaced by a first vector compared to the given image window in the first image,
the associated image window in the first image is displaced by a second vector compared to the identified image window in the second image, and
the evaluation of the quality takes into account a comparison of the first and second vector.

18. A non-transitory computer readable medium having program instructions stored thereon that can be executed by a processor for carrying out the method according to claim 1.

19. A device for estimating the movement of an image position of an image feature between a first image and a second image, the apparatus comprising a processor and a memory with instructions, wherein execution of the instructions by the processor results in the device:
determining a set of image windows in the first image, each image window having the image feature,
identifying at least a portion of the set of image windows in the second image,
for the portion of the set of image windows, evaluating the quality of an assignment of each image window in the first image to the given image window in the second image, and selecting one of the image windows on the basis of the evaluation,
estimating the movement of the image position of the image feature using the selected image window, wherein the set of image windows comprises an initial image window, and the method comprises a detection of an edge in the initial image window, wherein the determination of the image windows contained in addition to the initial image window in the set of image windows takes place on the basis of the detected edge.

* * * * *